United States Patent Office 2,708,632
Patented May 17, 1955

2,708,632

DEIONIZATION OF MILK

Edwin G. Stimpson, Sayville, N. Y., assignor to National Dairy Research Laboratories, Inc., Oakdale, N. Y., a corporation of Delaware No Drawing. Application July 14, 1951,
Serial No. 236,852

28 Claims. (Cl. 99—54)

This invention relates to the deionization of milk and, more particularly, to a process of preparing a deionized milk product whose protein and carbohydrate content is substantially equivalent to that of natural milk and whose ash content is considerably less than that of natural milk.

Cows' milk contains from 86 to 88% water, from 3 to 4% protein, from 3.5 to 4.5% fat, from 4.5 to 5% lactose and approximately 0.75% ash. The ash content is composed of mineral constituents, primarily sodium, potassium, calcium, phosphate, sulfate and chloride ions. For special dietary uses, a milk product having a low ash content, and particularly a negligible sodium content, is desirable. Such a product has, however, been difficult to prepare without destroying the character of natural milk.

Much work has been reported in the literature on methods for reducing the ash content of milk. It has been proposed, for example, that milk be treated with sodium zeolites. These materials, however, are effective only to replace calcium ion with sodium ion, and do not deionize. Thus in this process although calcium content is reduced the sodium content of the milk is increased. Moreover, in this process removal of anions other than phosphate is not possible.

The demineralization of whey has been worked out using separate beds of anion and cation exchange resins. However, it is not possible to deionize milk in this way. If milk is passed through a cationic exchange column, its pH is lowered to such an extent that the proteins coagulate and plug the column. On the other hand, passage of milk through an anionic exchange column raises the pH to such an extent that both the proteins and carbohydrates are damaged, and again a satisfactory product is not obtained.

Accordingly, it is an object of the present invention to prepare deionized milk products whose ash content is substantially less than that of natural milk, but whose protein and carbohydrate content is substantially unchanged.

It is a further object of the invention to prepare deionized milk products substantially equivalent to natural milk in character, appearance and flavor, but whose ash content is less than 30% the ash content of natural milk.

It is also an object of the invention to prepare deionized milk products whose sodium and chloride content is less than 5% that of natural milk.

It is a further object of the invention to prepare reconstitutable deionized concentrated fluid milks and deionized milk powders which can be combined with water to produce a milk product having a substantially lower ash content than natural milk.

It is a further object of the invention to provide a process for treating natural whole and concentrated milks with a mixed bed of cation and anion exchange resins in order to reduce the ash content thereof without otherwise changing their nature.

It is a further object of the invention to provide milk products whose protein and carbohydrate content is substantially equivalent to that of natural milk and which contains sodium, potassium, calcium, phosphate, sulfate and chloride ions in any desired proportions.

These objects are accomplished by treating milk with a mixture comprising one part of an anion exchange resin and from 0.8 to 1.33 parts of a cation exchange resin, said parts being determined on an ion exchange capacity basis, the proportions of said resins being selected in the stated ranges to maintain the pH of the effluent milk at within the range from 5.8 to 7.0. The milk undergoes no appreciable reduction in protein and carbohydrate content, but its ion (ash) content is reduced by from 60% to 80%. The effluent milk may be used per se, or it may be concentrated or even dried by a suitable process to produce a reconstitutable deionized milk powder product. The relative proportions of milk solids in these products are substantially the same as in natural liquid milk, except for the reduced ash content.

It is important in understanding the invention to distinguish between ion exchange, broadly, and deionization. Ion exchange processes involve the replacement of one ion by another through the action of an adsorbent material which possesses a stronger affinity for some cations and anions than for others. The substitution of sodium ion for calcium ion in water softening is an example of ion exchange. In deionization, however, which involves ion exchange but is usually differentiated therefrom because of the important differences in result, hydrogen and hydroxyl ions are substituted for cations and anions, respectively. Thus in deionization salt-forming cations and anions are completely removed. In all other ion exchange processes, one salt-forming anion or cation is merely substituted for another. Whereas in deionization dissolved salts are completely removed from solution, in other ion exchange processes one salt is merely replaced by another.

In the deionization process of the present invention, salt cations and anions present in milk are replaced by hydrogen and hydroxyl ions, respectively.

It is also important to distinguish conventional and reverse deionization processes from the mixed bed deionization process employed in the invention. In conventional deionization processes the material to be deionized is passed first into contact with a cation exchange resin, whereby cations are replaced by hydrogen ion, and then into contact with an anion exchange resin, whereby anions are replaced by hydroxyl ion. In reverse deionization processes, the anions are first replaced by hydroxyl ion by contact with an anion exchange resin and then subsequently the cations are replaced by hydrogen ion through contact with a cation exchange resin.

In the process of the present invention, employing a mixed bed of cation and anion exchange resins, substitution of hydrogen and hydroxyl ions for cations and anions takes place simultaneously.

The invention is particularly applicable to the deionization of cow's milk, but can also be used, with slight change, for the deionization of goat's milk, mare's milk, ewe's milk, etc.

Anion exchange resins of any basicity can be employed in the process of the invention. Synthetic resins having anion exchange properties are now well known to those skilled in the art and can be prepared in various ways.

In general, it may be said that, chemically, anion exchange resins are of a highly polymerized structure, carrying a number of amino, quaternary ammonium, or like basic groups, as exemplified by melamine-formaldehyde-guanidine resins, phenol-formaldehyde-poly-amine resins, and acetone-formaldehyde-polyamine resins. A number of these resins are described in Ion Exchange Resins by Robert Kunin and Robert J. Myers, published by John Wiley & Sons, New York (1950), at pages 57 to 60; the resins listed in the table at page 59 and in the description on these pages can be employed in the process of the invention. Other anion exchange resins which can be employed are described in Patents No. 2,341,907 to Harold C. Cheetham and Robert J. Myers, dated February 15, 1944, and No. 2,546,938 to William C. Bauman and George B. Husted, dated March 27, 1951.

Although either weak or strongly basic anion exchange resins can be employed with equally good results, insofar as the removal of anions is concerned, it has been found that weak anion exchange resins do not completely prevent strong cation exchange resins from removing some protein and therefore it is preferred to employ a strongly basic anion exchange resin to substantially prohibit protein removal.

A preferred class of strongly basic anion exchange resins is known to those skilled in the art as quaternary ammonium anion exchange resins. These contain a large plurality of available quaternary ammonium groups on the resin molecule, substituted on an aromatic isocyclic or heterocyclic ring or on an aliphatic chain, which may itself be substituted on an aromatic ring, and are obtained by polymerization of an aromatic amine and an aldehyde, such as formaldehyde, or a polyamine, a phenol and an aldehyde, such as formaldehyde, and then quaternizing the amino group in the resin, as shown, for example, in U. S. Patent No. 2,543,666 to Malden W. Michael, dated February 27, 1951. This class of resin may also be made by polymerizing a quaternary ammonium salt, a phenol and an aldehyde, or by polymerizing an aromatic benzene containing an ethylenic substituent and one or more quaternary ammonium groups. Commercially available quaternary ammonium anion exchange resins are sold under the trade names Amberlite IR–400 (available from the Rohm & Haas Company), Dowex 1, Dowex 2 and Nalcite SAR (all available from the Dow Chemical Company).

Typical anion exchange resins of lesser strength than the quaternary ammonium type resins but which also can be used in the process of the invention are Deacidite, Amberlite IR–45, Amberlite IR–4B, Duolite A2 and Wofatit M.

The cation exchange resin employed herein, in contrast to the anion exchange resin, must be strongly acidic. It has been found that in order to effectively remove sodium and potassium cations it must pass the following test for acidity: At least 10 cc. of a standard solution containing 0.0284 equivalents per liter of potassium acid phosphate and 0.0284 equivalents per liter of sodium hydroxide having a pH of 8.78 is passed through a volume of the mixed resin bed calculated to deionize the solution at 70 to 80° F. at a rate of flow of about 0.2 volume of solution per volume of resin per minute. A 10 cc. aliquot of this deionized solution shall require at least 10 cc. of a standardized 0.1 N-sodium hydroxide solution to bring it to a phenolphthalein end point. The term "strongly acidic" is used in the specification and claims to refer to cation exchange resins which pass this test.

The nuclear sulfonic acid-type cation exchange resins are sufficiently acidic to pass this test. These resins are likewise well known to those skilled in the art and contain a large plurality of sulfonic acid groups in the resin molecule substituted on an aromatic isocyclic or heterocyclic ring or on an aliphatic chain which may itself be substituted on an aromatic ring. These resins are prepared by interaction of an aldehyde, a phenol and a sulfuric acid or sulfite, or by sulfonating a resin having an aromatic ring in the molecule, such as tannin-aldehyde and phenol-aldehyde resins. Typical resins of this class are described in Patent No. 2,204,539 to Hans Wassenegger and Karl Jaeger, dated June 11, 1940, No. 2,366,007 to Gaetano F. D'Alelio, dated December 26, 1944, and No. 2,372,233 to Jack T. Thurston, dated March 27, 1945. Nuclear sulfonic acid type resins available commercially which meet the test conditions set forth are Amberlite IR-120 (available from the Rohm & Haas Company), Dowex 50 (the resin set forth in Patent No. 2,366,007 and available commercially from the Dow Chemical Company) and Nalcite HCR (available from the Dow Chemical Company).

Strongly acidic carboxylic acid type cation exchange resins, such as chloroacetic acid-containing resins, also are satisfactory.

Permutit 216, Alkalex and Wofatit C are too weak to pass the test described.

It will be apparent from the above that mixtures of a strong acidic cation exchange resin with either a strong basic or weakly basic anion exchange resin are operative in the process of the invention, while mixtures of a weakly acidic cation exchange resin with either a strongly basic or weakly basic anion exchange resin cannot be used in the process of the invention.

Present knowledge indicates that the proportion of the cation and anion exchange resins in the mixed bed employed in the invention are critical. The resins must be present on an essentially equivalent ion exchange capacity basis.

For purposes of estimating the proportions required for a given ion exchange resin, the ion exchange capacity of the moist resin is determined as follows: The freshly regenerated active ion exchange resin is rinsed and drained. Two samples of exactly 2 grams each are weighed out and placed in 150 cc. beakers. If the resin is an anion exchange resin, 25 cc. of 0.1 normal HCl are run into each beaker. If the resin is a cation exchange resin, 60 cc. of 0.1 normal NaOH are added instead. The samples are allowed to stand for 15 minutes with occasional stirring and then filtered rapidly through a stainless steel screen. The resin particles on the screen are washed with water and the filtrates back titrated using phenolphthalein. The moist resin capacity is then calculated as follows:

1. Number of cc. of 0.1 N solution originally mixed with resin
   Minus number of cc. of 0.1 N solution required for back titration
   Equals number of cc. of 0.1 N solution neutralized by resin.
2. The above value is averaged for the two samples.

3. $\dfrac{\text{Average number of cc. 0.1 N solution neutralized by resin}}{2 \text{ (Number of grams of resin used)} \times 10}$ Equals $\dfrac{\text{No. cc. 1.0 N solution neutralized}}{\text{Number of grams moist resin}}$ Since each cc. of a 1.0 N solution contains one milliequivalent weight this last equation also expresses the milli equivalent ion exchange capacity per gram of wet resin.

On an ion exchange capacity basis, from 0.8 to 1.33 parts of cation exchange resin may be employed for each part of anion exchange resin. Usually a larger amount of anion exchange resin is employed because most cation exchange resins have a higher ion exchange capacity. For maximum efficiency, i. e., an ion exchange capacity ratio of 1:1, a mixed bed of Amberlite IRA–400 and Amberlite IR–120 will contain from 60 to 70% by volume of the former and from 40 to 30% by volume of the latter.

It will be understood that these proportions apply only if the resin is fully regenerated. If the resin is not fully regenerated, an equivalent ion exchange capacity weight of the resin used is determined, and the mixed bed made up on the basis of this determination. In general, the most acceptable resin ratio is one where each resin is present at an approximately equivalent ion exchange capacity.

The invention is applicable to natural whole and skim milk and also to concentrated whole and skim milk of any desired solids content. Preferably, whole milk is homogenized before treatment.

Concentrated milks of the higher solids content may give rise to mechanical difficulties in running through the column of resin. The higher the solids content, the more slowly the milk tends to flow through the column, and at solids contents above about 30% ordinarily the rate of flow will be too slow to be practical in a commercial operation. Thus solids contents of the order of 19 to 20% are better. If a slow rate is not a disadvantage, however, concentrated milk of a solids content up to approximately 25% can be deionized by the process of the invention.

It has been found that a higher yield of solids, based on the weight of solids that are put through, is obtained when concentrated milk is deionized than when natural whole or skim milk is deionized. It is thought that this occurs because the solution being deionized is more concentrated, and this decreases the ionization of calcium salts. The potassium and sodium salts remain more or less fully ionized and therefore a higher proportion of sodium and potassium salts, relative to the calcium salts, can be absorbed on the resin.

It has been determined that the deionization should be carried out at a temperature above 60° F. for most efficient operation. At lower temperatures, the viscosity of the milk is such that its flow through the bed is very slow and the deionization is appreciably lengthened. At temperatures above 60° F. the flow is fast enough to make operation independent of viscosity in the case of milks which are not concentrated. The effect of temperature on resin ion exchange capacity is negligible, but some resins may require a maximum temperature of the order of 100° F. depending upon their chemical nature.

The rate of flow should be about 0.5 gal./min./cu. ft. of resin for maximum efficiency, at temperatures in the range of 75 to 80° F. The rate of flow will depend to a certain extent upon the resin used and its ion exchange capacity. At each temperature, there is an optimum flow rate, this optimum increasing with temperature.

The pH of the effluent milk will range from 5.8 to 6.5 when the mixed bed contains resins in the stated proportions. If the resin ratio is changed, a higher pH may be obtained, but at a pH of above 7 a loss in efficiency results. At a pH below about 5.0 milk protein will coagulate. Consequently, the resin proportions should be selected so as to maintain the pH of the effluent milk at within the range from 5.0 to 7.0, preferably 5.8 to 6.5.

During the first portion of any run analysis of the effluent milk shows that the sodium and potassium chloride and the sulfate ions are up to 99.5% removed, while the calcium is present in the effluent milk at a level of 50 to 55% of normal, and the phosphate at a slightly higher level. The remaining calcium and phosphate ions as well as sodium, potassium, sulfate, and chloride ions are thought to be bound in some way to the protein, so that they are not available for ion exchange.

As the ion exchange capacity of the resins becomes exhausted, the level of cations and anions in the effluent milk slowly rises. Inasmuch as the process is designed to deionize milk, use of a given mixed bed is continued only so long as hydrogen and hydroxyl ions are being exchanged for anions and cations. When this point has been passed, influent milk will undergo ion exchange with ions previously adsorbed, and effluent milk will be high in sodium, although remaining low in other cations.

For this reason, the ion exchange capacity of the mixed resin bed is followed by measuring the electrical conductivity of the effluent milk: while the ion exchange capacity is high, the conductivity is low, but as the sodium content rises, electrical conductivity also rises. When the conductivity has reached a value indicating that deionization has stopped and an exchange of sodium for other cations has begun, flow of milk through the bed is halted and the bed is regenerated.

In order to regenerate the resins, it is first necessary to separate the anion exchange resin from the cation exchange resin. This can be done by taking advantage of the difference in density of the resins. They may be separated, for example, by plunging the bed into sodium hydroxide solution, such as spent caustic solution from a previous regeneration, with air agitation. The less dense resin (usually the anion exchange resin) will be suspended in the caustic and can be drawn off at the top thereof, leaving the denser resin (usually the cation exchange resin) below. After the resins have been separated, the anion exchange resin is regenerated with sodium hydroxide solution of any desired concentration, preferably 2 to 10% and thoroughly rinsed with several portions of water, while the cation exchange resin is regenerated with 2 to 5% sulfuric acid solution and rinsed with several portions of water. Thereafter the resins are again combined and thoroughly mixed by suspending them in water with air agitation. The column can then be employed to deionize a second batch of milk.

For example, when the mixed bed is composed of Amberlite IRA–400 and Amberlite 120 for each 100 parts of mixed wet resins, equal to approximately 150 parts in volume, 350 to 500 parts of milk may be deionized. This amount of resin will give a composite effluent with at least 74% of its ash content removed.

When concentrated milk is deionized, it is desirable to rinse the column with water before regeneration.

The effluent milk may be cooled to storage temperatures and bottled, if desired, for distribution and use. It also may be condensed and sold in that form. It is recommended, however, that the effluent milk be condensed and dried or condensed and pasteurized directly after deionization because of the difficulties encountered in preserving it. If the product is dried, pasteurization is desirable, but optional.

Before heating the deionized milk at temperatures above about 130° F. for pasteurization, condensation, or both, pH adjustment is required. If the milk has a pH of 6.2, the protein will coagulate when the temperature approaches 140° F. On the other hand, if the pH of the milk is adjusted to 6.6 or 6.8 with 10% potassium hydroxide, protein will not coagulate, even at 185° F.

The effluent milk, after adjustment of pH, can be pasteurized either by a flash or holding method. If the milk is to be condensed, and is intended for human consumption, it is desirable to pasteurize the milk before rather than after condensation. A condensed milk pasteurized at 160° F. for ½ hour, although quite satisfactory, does not have as pleasing a taste as when it is pasteurized before condensing. Pasteurization can be carried out at temperatures from 145° to 185° F., for from 10 seconds to 30 minutes.

Condensation preferably is carried out in vacuo or at a reduced pressure at a temperature in the range from 90 to 135° F. Temperatures above 135° C. can be used if the pH of the milk lies within the range from 6.6 to 6.8 in order to prevent protein coagulation.

If desired, the condensed milk can be canned and then sterilized at temperatures from 236 to 242° F. for from 28 minutes to 25 minutes. In this event pasteurization is unnecessary. With regard to pH adjustments prior to sterilization, if the deionized milk is adjusted to a pH of 6.8, both condensation and sterilization can be carried out without mishap. If the pH adjustment has been taken to only 6.6 prior to condensation, the condensed material will be quite satisfactory, but it must then be adjusted to from 6.4 to 6.8 prior to sterilization.

A reconstitutable low salt milk powder may be produced by drying either the effluent milk or, preferably, milk condensed to 30% solids or higher. Both vacuum roll-drying and spray drying give a satisfactory powder, but the former is coarser and has a slightly higher solubility index. The air temperatures during drying should be controlled in order to avoid damage to the milk solids. In the spray drier, air inlet temperatures should be within the range from 280 to 330° F., and air outlet temperatures within the range from 180 to 220° F. Optimum conditions are an air inlet temperature of 300° F. and air outlet temperature of 200° F., feeding the milk to the drier at a rate of 3.5 gallons per hour. The product is cooled as quickly as possible after leaving the spray drier to a temperature of 40° F. or below.

A vacuum roll drier gives best results with a 3.6 second drying time, drum steam pressures to 15 to 30 p. s. i. g., a vacuum of 29.5 inches of mercury, and a feed concentration of 30% total solids. Production rate is 8.5 to 12 lbs. of product per hour. The product has a solubility index of 0.5 to 1.0 ml. and contains 2 to 4% moisture.

This product may be reconstituted by dilution with water to give a milk beverage of any desired solids concentration.

The effluent milk may also be dried by a freeze drying technique at a temperature of 32° F. or below in vacuo. This procedure is slower than spray drying and more expensive, and therefore less practical from a commercial standpoint, but a product of superior taste properties is obtainable.

The ash content of the effluent milk may be adjusted to any desired value. For example, if a milk of low sodium content is desired, normal amounts of potassium, calcium, phosphate and chloride ions being permissible, potassium, calcium, chloride and phosphate-containing salts, such as potassium dihydrogen phosphate, potassium hydrogen diphosphate, potassium chloride, calcium lactate and calcium chloride, may be added to the effluent milk to bring their concentrations to their normal proportions. Thus a product is obtainable whose sodium content only is reduced, compared to natural milk.

The ash content of the effluent milk may be increased above that present in natural milk, in any respect, as desired, by appropriate addition of salts, in order to meet special dietary requirements. By proper choice of salt additions, a dietarily satisfactory ratio of calcium to phosphorus may be maintained and enough potassium may be restored to assure normal protein metabolism.

The following example is given to further instruct those skilled in the art in the practice of the invention.

EXAMPLE 1

110 gallons of fresh whole milk was separated by standard procedures to remove substantially all fat and the skim milk obtained pasteurized at 160° F. for ½ hour. 26.5 gallons of this batch was then heated to approximately 70° F. and passed through approximately 8.5 gallons of a previously prepared mixed bed of Amberlite IRA–400 Resin (an anion exchange resin available commercially from the Rohm & Haas Company) and Amberlite IRC–120 Resin (a cation exchange resin available commercially from the Rohm & Haas Company). This bed contained 65% of the former resin and 35% of the latter resin. In these proportions, each resin is present in an essentially equivalent capacity basis. The resin-containing column was a glass cylinder eight inches in internal diameter and five feet high, with Tygon-coated black iron conical base and flat top. The resins were retained on a 40 mesh stainless steel screen. A twin column was connected in parallel to the resin-containing column for regeneration of the anion exchange resin.

The skim milk was flowed through the column at a rate of 0.5 gallon per minute throughout the run. The temperature of the effluent milk ranged from 68° F. to 73° F., and its pH from 6.0 to 6.5. The conductivity varied from 60 to 340 micromhos. After filtering through a Farmer's filter to remove particles of resin and other foreign matter, the effluent milk (24 gallons) was brought to a pH of 6.6 to 6.8 by addition of 220 cc. of 10% potassium hydroxide solution. The neutralized milk was pasteurized at 160° F. for 14 seconds, cooled and stored at 40° F.

The mixed bed was then prepared for another batch of skim milk as follows: First it was rinsed with approximately 15 gallons of water and then completely drained. Spent 10% sodium hydroxide solution which had been previously used to regenerate the anion exchange resin was pumped into the bed upflow until the bed was covered.

Air was passed upflow into the cone at 5 to 6 p. s. i. in order to break up the resin and then more spent sodium hydroxide solution was pumped in upflow to separate the anion and cation exchange resins. The rate of flow of the spent caustic solution was increased very slowly from 1.5 gal./min./ft.$^3$ to 7 gal./min./ft.$^3$ until all of the anion exchange resin had been washed out at the top of the column. The column was then drained and rinsed with tap water at a downflow rate of 2 to 3 gal./min./ft.$^3$.

The anion exchange resin (5.6 gals.) which had been separated from the cation exchange resin was regenerated by treating downflow for 30 minutes with 15 gallons of 10% sodium hydroxide solution and then rinsed downflow for 35 minutes with 33 gallons of water. Spent caustic was collected for reuse. The cation exchange resin (2.6 gals.) which remained in the column was broken up with air agitation for a few minutes and then rinsed downflow with 21 gallons of tap water, partially regenerated by treating for 30 minutes with 15 gallons of spent 5% sulfuric acid solution which had previously been used to regenerate the resin from a previous batch, and then completely regenerated by treating for 30 minutes with 15 gallons of a 5% sulfuric acid solution, and rinsed downflow for 35 minutes with 25 gals. of tap water.

The regenerated resins were then brought together again, covered with water and then intimately mixed by air agitation at 6 to 8 p. s. i. for 10 minutes. The water was drained to the level of the resin in the column and the column was then ready to deionize a second portion of the 100 gallon batch of milk.

The remainder of the milk was then deionized as set forth for the first portion, in three portions. The four portions of neutralized, pasteurized deionized skim milk were then combined, to give a total of 93 gallons.

This milk was concentrated at a temperature of 120° F. and a vacuum of 28 inches of mercury to approximately 17 gallons having a total solids content of 36.63%. The condensed milk was cooled to 50 to 55° F., clarified in a bowl separator and then spray dried.

A two-fluid external mixing nozzle was used in the Bowen spray drier. The air inlet temperature was held at 300° F. and the air outlet temperature at 200° F., while the milk was fed to the drier at a rate of 3.5 gals./hr. The product contained less than 3% moisture and had a solubility index of 0.05 ml. Of the approximately 47.25 pounds of solids entering the drier, 41 pounds of dried product was obtained at the end of 5 hours and 10 minutes. This product was passed through a homoloid pulverizer using a 0.02 mesh screen.

An analysis of the dry product is compared below with a spray-dried skim milk:

Table 1

|  | Skim Milk Powder, Percent by wt. | Deionized Skim Milk Powder, percent by wt. | Percent Removed |
| --- | --- | --- | --- |
| Ash | 9.0 | 2.35 | 73.9 |
| Protein | 35.60 | 38.9 |  |
| Lactose H$_2$O | 52.00 | 57.2 |  |
| Na (by ash) | 0.57 | 0.012 | 98.0 |
| K | 1.60 | 0.022 | 98.6 |
| Ca | 1.32 | 0.6 | 55.0 |
| Cl | 1.10 | trace | 99.9 |
| PO$_4$ | 2.85 | 1.1 | 61.0 |
| SO$_4$ | 0.35 | trace | 99.9 |
| Solubility index |  | less than 0.05 ml |  |

Thus in this product of the invention the milk protein and carbohydrate content is unchanged compared to natural milk, while the ash content is only 26.1% that of natural milk. Over 98% of the sodium, potassium, chloride and sulfate present in the skim milk, compared to natural milk, have been removed. Simultaneously, all ionizable calcium and phosphate ions have been removed. This represents a 55% removal of calcium and 61% removal of phosphate.

The dry powder readily reconstitutes with water to give a palatable source of milk protein and carbohydrate. However, the vitamin content as well as the mineral content is reduced in the powder, compared to the original skim milk, so that the use of vitamin preparations should be continued.

A second run was made exactly as set forth, but in this run a 10% solution of potassium hydroxide was added to the deionized fluid milk in an amount to adjust the pH to 6.8. Thereafter the milk was concentrated at 120° F. under a vacuum of 28 inches of mercury to a solids content of 30%. The concentrate was then canned and sterilized by heating at 241° F. for 26 minutes.

The product had the following analysis:

| | Percent |
|---|---|
| Total solids | 25.3 |
| Lactose $H_2O$ | 14.5 |
| Protein ($N \times 6.38$) | 9.55 |
| Ash | 0.58 |
| Ca | 0.15 |
| Na | 0.004 |
| K | 0.045 |
| $PO_4$ | 0.30 |

A number of cans of this product were stored at —20° F., 40° F., room temperature (70–75° F.) and 100° F. The shelf life at 100° F. was about two months. The can stored at 40° F. and at 70–75° F. had a shelf life of over eight months. During storage the flavor actually improved in each case, as a slight chalkiness initially noticeable gradually disappeared. Frozen storage at —20° F. is not to be recommended, however, since protein separation occurred within six months.

EXAMPLE 2

Example 1 was repeated, employing concentrated milk having a solids content of 21.5% (normal skim milk has a solids content of 7.9 to 8.5%). The process conditions were identical with Example 1.

Table II

| Solids content of influent | percent | 21.5 |
|---|---|---|
| Influent pH | | 6.33 |
| Influent specific resistance | ohms | 120 |
| Influent sodium content | microg./ml. | 1,150 |

| Eff. Vol. per Vol. resin | pH | Specific Resistance, ohms | Na (microg./ml.) |
|---|---|---|---|
| 0.159 | 6.44 | 5,700 | |
| 0.318 | 6.42 | 4,800 | |
| 0.476 | 6.44 | 4,400 | |
| 0.635 | 6.43 | 4,100 | |
| 0.954 | 6.47 | 2,800 | 25 |
| 1.270 | 6.47 | 2,400 | 45 |
| 1.460 | 6.43 | 1,850 | |
| 1.650 | 6.56 | 1,500 | 80 |
| 1.810 | 6.56 | 1,200 | 125 |
| 2.000 | 6.78 | 800 | 210 |
| 2.220 | 6.80 | 550 | 350 |

The following table compares the data collected with a run with 7.9% skim milk and shows that when concentrated milk is run there is a higher yield in terms of weight units of milk solids per volume of resin:

Table III

| Skim Milk Sample | Liquid Vol./Vol. Resin | Wt. Units Milk Solids/ Vol. Resin |
|---|---|---|
| 7.9% Solids Content | 2.8 | 0.221 |
| 15.0% Solids Content | 2.5 | 0.375 |
| 21.5% Solids Content | 1.4 | 0.301 |

The deionized concentrated milk which originally had a 21.5% solids content was then concentrated and spray-dried as in Example 1.

EXAMPLE 3

A palatable whole milk drink is prepared by mixing 5 level tablespoons (22.5 grams) of the powder produced in Example 1 or 2 with 4 level teaspoons (20 grams) of heavy cream in enough water to make one cup of final volume. Thirteen cupfuls of this beverage contain less sodium than one cup of regular whole milk, and its taste is much like that of fresh whole milk except for a flatness due to its low salt content.

A palatable beverage may be prepared by mixing 10 level tablespoons (45 grams) of the powder in enough water to give one cup of final volume. Twenty-five cups of this contain less sodium than one cup of regular whole milk.

A skim milk type beverage may be prepared by mixing 5 level tablespoons (22.5 grams) of the powder in enough water to give one cup of final volume. Fifty cupfuls contain less sodium than one cup of regular skim milk.

The dry powder is also useful in preparing cocoa, as a substitute for fresh milk or cream upon cereal, and in coffee.

The following table compares with skim milk and whole milk the mineral, protein and caloric content of one glass (8 ounces) of this powder reconstituted with water and/or cream as set forth above:

Table IV

| Preparation | Fat | Calories | Protein (grams) | Calcium (milligrams) | Phosphate (milligrams) | Sodium (milligrams) | Potassium (milligrams) |
|---|---|---|---|---|---|---|---|
| Low Salt Milk as Beverage (20% Total solids) | 0.2 | 184 | 18 | 280 | 423 | 6 | 80 |
| Low Salt Milk as Skim Milk (10% Total solids) | 0.1 | 92 | 9 | 140 | 211 | 3 | 40 |
| Low Salt Milk with Cream (13.5% Total solids) | 3.25 | 168 | 9.44 | 156 | 250 | 11 | 66 |
| Skim Milk (9.3% Total solids) | 0.1 | 84 | 8.4 | 312 | 675 | 139 | 380 |
| Whole Milk (13.2% Total solids) | 4.0 | 168 | 8.64 | 286 | 656 | 131 | 365 |

The deionized milk produced in accordance with the invention is useful wherever there is required a substantially or largely salt-free product containing milk protein and lactose, as well as other non-salt milk solids. The effluent milk product is somewhat sweeter in taste than natural milk, but acquires substantially no flavor from the resins with which it is placed in contact. Therefore, the effluent milk of the invention is particularly adapted to meet special dietary needs, either in liquid form, or sterilized and condensed, or dried to form a deionized milk powder capable of being rapidly reconstituted by addition of water, milk or cream to form a liquid deionized milk product.

Various changes and modifications may be made in the invention, as will be apparent to those skilled in the art, and the invention is not to be limited except as set forth in the following claims.

All parts and percentages in the specification and claims are by weight.

I claim:

1. A process of deionizing milk which comprises treating the milk with a mixture comprising 1 part of an anion exchange resin and from 0.8 to 1.33 parts of a strongly acidic cation exchange resin, said parts being determined on an ion exchange capacity basis, the proportions of said resins being selected within the stated ranges to maintain the pH of the effluent milk at within the range from 5.0 to 7.0.

2. A process in accordance with claim 1 in which the milk being treated has a solids content of at least 10%.

3. A process in accordance with claim 1, in which the anion exchange resin is of the quaternary ammonium type, and the cation exchange resin is of the nuclear sulfonic acid type.

4. A process in accordance with claim 1, in which the anion exchange resin is of the amine type, and the cation exchange resin of the nuclear sulfonic acid type.

5. A process of deionizing milk which comprises treating the milk with a mixture comprising essentially equivalent proportions, on an ion exchange capacity basis, of an anion exchange resin and a strongly acidic cation exchange resin to maintain the pH of the effluent milk at within the range from 5.0 to 7.0.

6. A process of deionizing milk which comprises treating the milk with a mixture comprising an amount within the range of 60 to 70% by volume of a strongly basic anion exchange resin and an amount in the range from 40 to 30% by volume of a strongly acidic cation exchange resin, the proportions of said resins being selected within the stated ranges to maintain the pH of the effluent milk at within the range from 5.0 to 7.0.

7. A process of deionizing homogenized whole milk which comprises treating the homogenized milk with a mixture comprising 1 part of an anion exchange resin and from 0.8 to 1.33 parts of a strongly acidic cation exchange resin, said parts being determined on an ion exchange capacity basis, the proportions of said resins being selected within the stated ranges to maintain the pH of the effluent milk at within the range from 5.0 to 7.0.

8. A process of deionizing skim milk which comprises treating the skim milk with a mixture comprising 1 part of an anion exchange resin and from 0.8 to 1.33 parts of a strongly acidic cation exchange resin, said parts being determined on an ion exchange capacity basis, the proportions of said resins being selected within the stated ranges to maintain the pH of the effluent milk at within the range from 5.0 to 7.0.

9. A process of deionizing whole milk which comprises heating whole milk to 60° F. and then treating the whole milk at a temperature of at least 60° F. with a mixture comprising 1 part of an anion exchange resin and from 0.8 to 1.33 parts of a strongly acidic cation exchange resin, said parts being determined on an ion exchange capacity basis, the proportions of said resins being selected within the stated ranges to maintain the pH of the effluent milk at within the range from 5.0 to 7.0.

10. A process of deionizing milk which comprises treating the milk at a temperature above 60° F. with a mixture comprising 1 part of an anion exchange resin and from 0.8 to 1.33 parts of a strongly acidic cation exchange resin, said parts being determined on an ion exchange capacity basis, the proportions of said resins being selected in the stated ranges to maintain the pH of the effluent milk at within the range from 5.0 to 7.0.

11. A process of preparing a concentrated deionized milk which comprises treating the milk with a mixture comprising 1 part of an anion exchange resin and from 0.8 to 1.33 parts of a strongly acidic cation exchange resin, said parts being determined on an ion exchange capacity basis, the proportions of said resins being selected in the stated ranges to maintain the pH of the effluent milk at within the range from 5.0 to 7.0, adjusting the pH of the effluent to about 6.4 to 6.8, and then concentrating the effluent milk to at least a 10% solids content.

12. A process in accordance with claim 11 which includes adjusting the pH of the concentrated milk to about 6.6 to 6.8 and canning and sterilizing the concentrated product.

13. A process in accordance with claim 11 which includes drying the concentrated product.

14. A process of deionizing milk which comprises treating the milk with a mixture comprising 1 part of an anion exchange resin and from 0.8 to 1.33 parts of a strongly acidic cation exchange resin, said parts being determined on an ion exchange capacity basis, the proportions of said resins being selected in the stated ranges to maintain the pH of the effluent milk at within the range from 5.0 to 7.0, adjusting the pH of the effluent milk to from 6.6 to 6.8 and pasteurizing the effluent milk.

15. A process in accordance with claim 14 which includes concentrating the milk to at least a 10% solids content.

16. A deionized natural fluid milk in the form of a stable liquid dispersion having a pH within the range of 5.0 to 7.0 and a total ash content less than 40% that of the ash content of the original natural fluid milk before deionization, the sodium, potassium, chloride and sulfate ion contents having been deionized to the extent of at least about 80% and the calcium and phosphate ion contents having been deionized to the extent of at least about 45% compared to the corresponding ion contents of the original nondeionized natural fluid milk, and whose protein and carbohydrate contents are substantially undiminished.

17. A deionized natural fluid milk in accordance with claim 16 whose sodium, potassium, chloride and sulfate ion contents have been deionized to the extent of at least 98% compared to the corresponding ion content of the original nondeionized natural fluid milk.

18. A deionized natural fluid milk in accordance with claim 16 having a pH within the range of 5.8 to 6.5.

19. A deionized reconstitutable natural milk powder having, when reconstituted with water, a pH within the range of 5.0 to 7.0 and having a total ash content less than 40% that of the ash content of the original natural fluid milk before deionization, the sodium, potassium, chloride and sulfate ion contents having been deionized to the extent of at least about 80% and the calcium and phosphate ion contents having been deionized to the extent of at least about 45% compared to the corresponding ion contents of the original nondeionized natural fluid milk, and whose protein and carbohydrate contents are substantially undiminished.

20. A deionized concentrated natural fluid milk having a solids content of at least 10%, a pH within the range of 5.0 to 7.0 and a total ash content less than 40% that of the ash content of the original natural fluid milk before deionization, the sodium, potassium, chloride and sulfate ion contents having been deionized to the extent of at least about 80% and the calcium and phosphate ion contents having been deionized to the extent of at least about 45% compared to the corresponding ion contents of the original nondeionized natural fluid milk, and whose protein and carbohydrate contents are substantially undiminished.

21. A sterilized deionized natural fluid milk having a pH within the range of 5.0 to 7.0 and a total ash content less than 40% that of the ash content of the original natural fluid milk before deionization, the sodium, potassium, chloride and sulfate ion contents having been deionized to the extent of at least about 80% and the calcium and phosphate ion contents having been deionized to the extent of at least about 45% compared to the corresponding ion contents of the original nondeionized natural fluid milk, and whose protein and carbohydrate contents are substantially undiminished.

22. A sterilized deionized concentrated natural fluid milk having a solids content of at least 10%, a pH within the range of 5.0 to 7.0 and a total ash content less than 40% that of the ash content of the original natural fluid milk before deionization, the sodium, potassium, chloride and sulfate ion contents having been deionized to the extent of at least about 80% and the calcium and phosphate ion contents having been deionized to the extent of at least about 45% compared to the corresponding ion contents of the original nondeionized natural fluid milk, and whose protein and carbohydrate contents are substantially undiminished.

23. A deionized natural fluid milk in the form of a stable liquid dispersion having a pH within the range of 5.0 to 7.0, a sodium ion content not in excess of about 2% of the corresponding sodium ion content of the original nondeionized natural fluid milk and whose potassium, calcium, chloride, sulfate and phosphate ion contents and whose protein and carbohydrate contents are substantially undiminished compared to the corresponding contents of the original nondeionized natural fluid milk.

24. A process in accordance with claim 1 which includes adding to the effluent milk an amount of at least one ion selected from the group consisting of sodium, potassium, calcium, chloride, sulfate and phosphate ions removed in the deionization to increase the concentration thereof in the deionized milk.

25. A process in accordance with claim 24 which includes restoring to the normal value the concentration in the effluent milk of at least one of said ions removed in the deionization.

26. A process in accordance with claim 24 which includes restoring to the normal value the concentration in the effluent milk of all of said ions removed in the deionization except sodium.

27. A deionized natural whole fluid milk in the form of a stable liquid dispersion having a pH within the range of 5.0 to 7.0 and a total ash content less than 40% that of the ash content of the original natural fluid milk before deionization, the sodium, potassium, chloride and sulfate ion contents having been deionized to the extent of at least about 80% and the calcium and phosphate ion contents having been deionized to the extent of at least about 45% compared to the corresponding ion contents of the original nondeionized natural fluid milk, and whose protein and carbohydrate contents are substantially undiminished.

28. A deionized natural fluid skimmilk in the form of a stable liquid dispersion having a pH within the range of 5.0 to 7.0 and a total ash content less than 40% that of the ash content of the original natural fluid skimmilk before deionization, the sodium, potassium, chloride and sulfate ion contents having been deionized to the extent of at least about 80% and the calcium and phosphate ion contents having been deionized to the extent of at least about 45%, compared to the corresponding ion contents of the original nondeionized natural fluid skimmilk, and whose protein and carbohydrate contents are substantially undiminished.

References Cited in the file of this patent

UNITED STATES PATENTS

| | | |
|---|---|---|
| 2,102,642 | Otting et al. | Dec. 21, 1937 |
| 2,465,906 | Meade et al. | Mar. 29, 1949 |
| 2,503,866 | Chrysler et al. | Apr. 11, 1950 |
| 2,511,825 | Myers | June 13, 1950 |
| 2,541,568 | Baur et al. | Feb. 13, 1951 |

OTHER REFERENCES

Tiger, H. L., and Sussman, S.: "Demineralizing Solutions by a Two Step Ion Exchange Process," Industrial Engineering Chemistry, February 1943, pages 186 to 191.

"Readjustment of Salts in Milk by Base Exchange Treatment," by J. F. Lyman et al.; pages 1 to 5, page 4 only reprinted from Industrial and Eng. Chemistry, vol. 25, page 1297, November 1933.